United States Patent

Kamel

[11] Patent Number: 5,963,166
[45] Date of Patent: Oct. 5, 1999

[54] PRECISE SPACECRAFT CAMERA IMAGE NAVIGATION AND REGISTRATION

[75] Inventor: Ahmed Kamel, Los Altos, Calif.

[73] Assignee: Space Systems/Loral, Inc., Palo Alto, Calif.

[21] Appl. No.: 09/121,507

[22] Filed: Jul. 23, 1998

[51] Int. Cl.$^6$ ........................................... G01S 5/02
[52] U.S. Cl. ............... 342/357.01; 342/352; 342/357.06; 701/222
[58] Field of Search ................................. 342/352, 357.06, 342/357.01, 355, 462; 701/222, 226; 250/203.6, 206.1

[56] References Cited

U.S. PATENT DOCUMENTS

| | | | |
|---|---|---|---|
| 3,952,151 | 4/1976 | Jenkin | 176/6.8 |
| 4,674,715 | 6/1987 | Frisch | 244/171 |
| 4,688,092 | 8/1987 | Kamel et al. | 358/109 |
| 5,189,295 | 2/1993 | Falbel | 250/206.2 |
| 5,745,869 | 4/1998 | van Bezooijen | 701/222 |
| 5,793,813 | 8/1998 | Cleave | 375/259 |

Primary Examiner—Thomas Tarcza
Assistant Examiner—Dao L. Phan
Attorney, Agent, or Firm—Kenneth W. Float

[57] ABSTRACT

A precise, spacecraft camera image navigation and registration system and method wherein a computer 36 on-board the spacecraft and a ground system comprising at least two ground stations precisely compute image navigation and registration data from precise data measurements. The computer on-board the spacecraft (spacecraft control system) uses precise star tracker, gyro, and earth sensor attitude data to precisely point the spacecraft and the camera. The ground system utilizes precise star measurement data from the camera and range data from the ground stations time tagged with GPS precise clock data. The ground system uses these precise measurements to determine precise orbit and attitude coefficients and uploads these coefficient to the spacecraft. The computer on-board the spacecraft uses these precise coefficients to generate and apply precise signals to compensate for slow orbit and attitude variations and register camera images in real time. The computer on-board the spacecraft is also used to generate camera commands to eliminate the need to upload a large number of daily ground commands, which therefore simplifies ground operations.

17 Claims, 9 Drawing Sheets

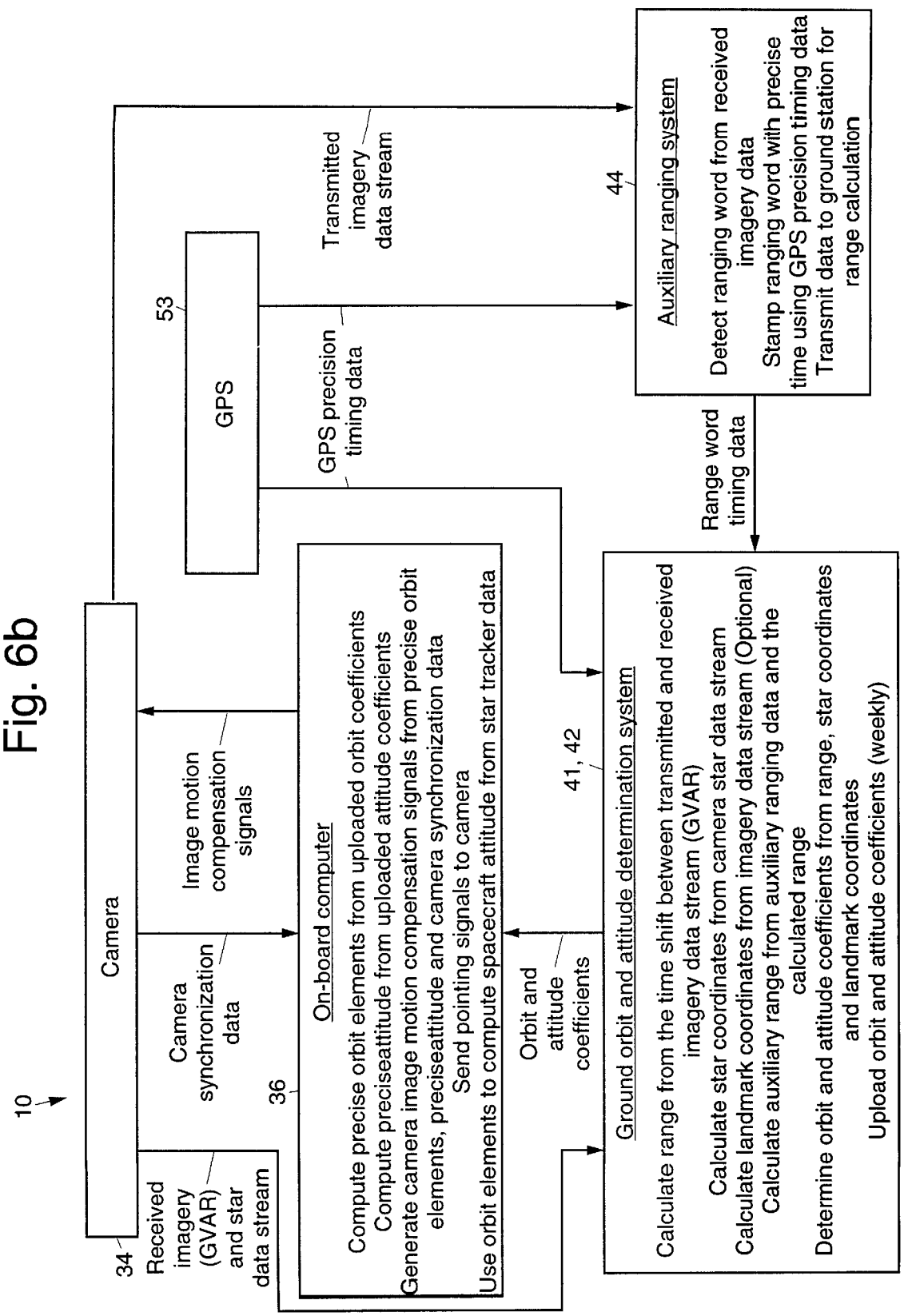

PRECISE SPACECRAFT CAMERA IMAGE NAVIGATION AND REGISTRATION

BACKGROUND

The present invention relates generally to satellite-based imaging systems that are used to observe and predict weather patterns, and more particularly, to a satellite-based imaging system that provides improved weather prediction capability and simplified ground operations.

The assignee of the present invention has developed and deployed a geostationary operational environmental satellite (GOES I-M) that contains an imaging system that operates in both the visible and infrared regions of the spectrum and generates digitized images of the Earth. The digitized images generated by the imaging system are used for a variety of purposes, including weather prediction, monitoring and analyzing flash floods, and determining wind velocity by tracking cloud motion, for example.

While the performance of this system is good, it is the practice of the present assignee to continually improve the performance of its systems. To that end, it has been found that the performance of the GOES I-M imaging system could be improved.

It has been determined that thermal backloading on instrument thermal coolers could be substantially reduced by removing the solar sail and boom from the GOES I-M satellite. Furthermore it has been determined that the use of pulsed plasma thrusters along with star trackers and continuously operating gyros permits improved image navigation and registration (INR). A discussion of image navigation and registration as is applies to prior spacecraft systems deployed by the assignee of the present invention may be found in U.S. Pat. Nos. 4,688,091 and 4,688,092, issued Aug. 18, 1987, for example. Furthermore, it has been determined that the addition of an auxiliary ranging station greatly improve orbit determination (150 meters vs. 1000 meters) to provide for improved star tracker operation.

It would therefore be desirable to have a satellite system embodying an imaging system that provides for improved weather predicting performance and that overcomes limitations of existing systems. Accordingly, it is an objective of the present invention to provide for a satellite-based imaging system that provides improved weather prediction capability. It is a further objective of the present invention to provide for a satellite-based imaging system that has reduced thermal backloading. It is another objective of the present invention to provide for a satellite-based imaging system that has improved image navigation and registration performance. It is another objective of the present invention to provide for a satellite-based imaging system that has simplified ground operations compared to prior systems.

SUMMARY OF THE INVENTION

To accomplish the above and other objectives, the present invention provides for an improved system that includes a spacecraft- or satellite-based imaging system and ground support and processing equipment that may be used for weather prediction purposes. The present invention includes numerous aspects that improve the imaging camera pointing accuracy and simplify ground-based operations.

The present invention provides for a precise, spacecraft camera image navigation and registration system and method wherein a computer on-board the spacecraft and a ground system precisely compute image navigation and registration data from precise data measurements. A spacecraft control system (the on-board computer) uses precise star tracker, gyro, and earth sensor attitude data to precisely point the spacecraft and the camera. The ground system utilizes precise star measurement data from the camera and range data from two ground stations time tagged with GPS precise clock data. The ground system uses these precise measurements to determine precise orbit and attitude coefficients and uploads these coefficients to the spacecraft. The computer on-board the spacecraft uses these precise coefficients to generate and apply precise signals to compensate for slow orbit and attitude variations and register camera images in real time. The computer on-board the spacecraft is also used to generate camera commands to eliminate the need to upload a large number of daily ground commands, which therefore simplifies ground operations.

The system comprises a spacecraft having an imaging system, and ground-based equipment that communicates with the spacecraft. The imaging system typically comprises a plurality of cameras, including an imager and a sounder (i.e., cameras) that are each coupled to thermal coolers. The pointing directions of the imager and sounder are controlled by gimbaled mirrors. The spacecraft also comprises a plurality of pulsed plasma thrusters, a plurality of momentum wheels, a plurality of earth sensors, a plurality of gyros, and a plurality of star trackers. The ground-based equipment processes downloaded image data derived from the imager and the sounder and uploads coefficients for image motion compensation. An on-board computer comprising attitude control electronics uses the uploaded coefficients to compute the camera attitude and spacecraft orbital elements as a function of time. The on-board computer also generates image motion compensation signals to precisely adjust pointing of the image and sounder mirrors.

The present invention provides for substantially reduced thermal backloading on the thermal coolers used by the imager and sounder by eliminating the use of the solar sail and boom employed on previous spacecraft. This aspect produces zero thermal backloading on the imager and sounder thermal coolers, resulting in a higher signal-to-noise ratio for infrared (IR) data derived from the imager and sounder. This, along with the use of yaw flip maneuvering capability, improves the weather prediction capability of the system. Because of the improved signal to noise ratio of the data that is processed, the present invention is capable of detecting small tongues of wet and dry air to anticipate severe weather and is also capable of observing night-time fog.

To precisely and continuously compensate for solar torque, the present invention uses pulsed plasma thrusters which imparts a minimal number of momentum changes and dynamic disturbances to the spacecraft. The pulsed plasma thrusters in combination with the star trackers, four momentum wheels, and inertial reference units (gyros) provide for continuous, precise image navigation and registration. This also eliminates housekeeping intervals, thereby allowing continuous imaging and sounding by the imaging system, and provides system robustness against momentum wheel failures. Housekeeping refers to times when the thrusters are fired for purposes of attitude control or momentum dumping.

The attitude control electronics (or attitude control electronics computer) on-board the spacecraft provides autonomous command capability. Autonomous imaging system operation is provided using less than 50 commands per day versus 3,500 for the previously deployed GOES I-M system. Furthermore, weekly uploads of image motion compensation (IMC) data are sent to the attitude control electronics instead of daily IMC data uploads to the GOES I-M system. These operational attributes significantly simplify operations at the ground-based equipment, and particularly the space operations control center.

The use of an auxiliary ranging station provides for greatly improved orbit determination (150 meters vs. 1000 meters) for star tracker operation. The ranging systems employed in the auxiliary ranging station and the command and data acquisition station are used in conjunction with the orbit and attitude tracking system in the command and data acquisition station to determine the orbit position of the spacecraft to less than 150 meters (4 μrad). The ranging systems use GPS timing information to substantially eliminate orbit position error as a source of image navigation and registration error. The auxiliary ranging station also provides orbit information for star tracker operation, and sounder navigation and registration in case of imager failure.

Thus, the present invention simplifies ground operations required to process data received from the spacecraft and upload data to control the spacecraft and cameras. The use of the star trackers reduces uploading of image motion compensation coefficients from the command and data acquisition station. The image motion compensation coefficients are uploaded once a week to provide for fixed gridding of the camera images (i.e., maintain the image points, or grid, corresponding to geographical boundaries, fixed regardless of time). Furthermore, the use of the auxiliary ranging station eliminates the need for imaging processing to locate landmarks to determine the orbit of the spacecraft.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 6b illustrates image motion compensation processing performed by an embodiment of the present satellite based imaging system;

DETAILED DESCRIPTION

Figure 1:
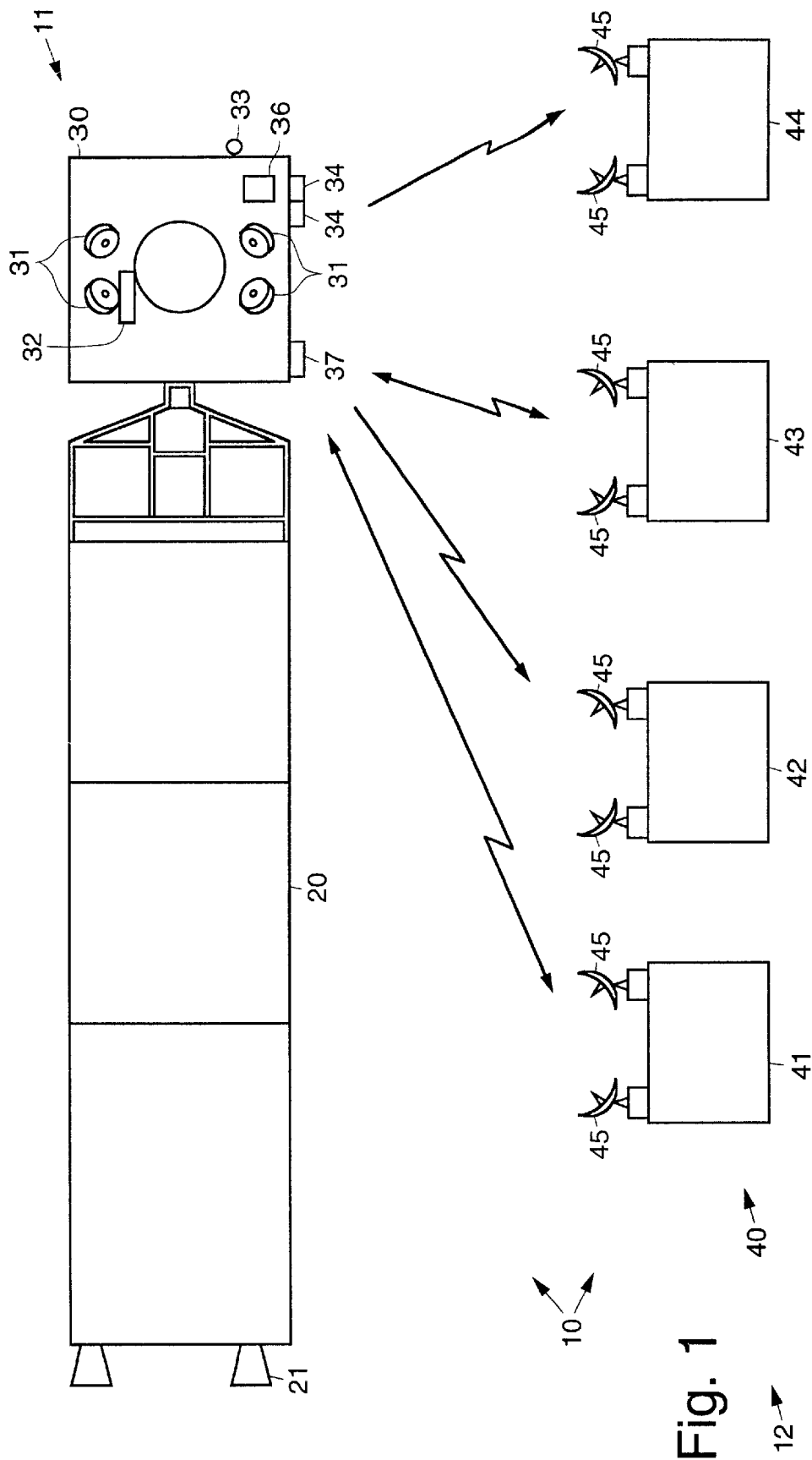
FIG. 1 illustrates the architecture of a geostationary operational environmental satellite (GOES) imaging system in accordance with the principles of the present invention.

Referring to the drawing figures, FIG. 1 is a block diagram illustrating the architecture of a geostationary operational environmental satellite (GOES) imaging system 10 in accordance with the principles of the present invention. The GOES imaging system 10 includes a space-based segment 11 comprising a spacecraft 20 or satellite 20, and a ground segment 12 comprising ground-based equipment 12.

The spacecraft 20 includes the imaging system 10 which typically comprises an imager 34 and a sounder 34 (i.e., cameras 34), which generate images using steerable (controllable) pointing mirrors 34i a, and attitude control electronics (ACE) 36 (or attitude control electronics computer 36) that controls the spacecraft 20 and generates image motion compensation signals to adjust pointing of the cameras 34. The imager 34 is a camera 34 that provides multispectral radiometric imaging of the surface of a central body, such as Earth. The sounder 34 is a camera that measures moisture content and temperature within he earth's atmosphere on a pixel-by-pixel basis. The imager 34 and sounder 34 use the controllable pointing mirror 34a to produce images of the Earth. The attitude control electronics 36 and the cameras 34 (imager 34 and sounder 34) are generally described in documents entitled "Geostationary Operational Environmental Satellite, GOES I-M System Description", by John Savides, Space Systems/Loral, December, 1992 and "GOES I-M System Databook", Space Systems/Loral, DRL 101-08.

The image motion compensation performed in the attitude control electronics computer 36 compensates for deterministic long-term orbit and attitude deviations from ideal synchronous orbit and zero attitude using ground-supplied image notion compensation coefficients. The attitude control electronics 36 implements an image motion compensation algorithm that provides images registered at the source (without resampling). In other words, the image motion compensation algorithm registers the respective images produced by the camera 34 in real time by adjusting the camera pointing to compensate for the camera drift relative to the central body (Earth).

A plurality of pulsed plasma thrusters 21 are used on the spacecraft 20 in lieu of a sail and boom employed on prior spacecraft. Elimination of solar sail and boom substantially reduces thermal backloading on imager and sounder coolers. This produces zero thermal backloading on the thermal coolers of the imager 34 and sounder 34, which produces a higher signal-to-noise ratio for infrared (IR) data generated by the imager 34 and sounder 34.

The spacecraft 20 uses four momentum wheels 31, two inertial reference units 32 (gyros 32), and three star trackers 33. The inertial reference units 32 or gyros 32 and star trackers 33 provide continuous attitude-sensing. Signals derived from the momentum wheels 31, the gyros 32 and the star trackers 33 are processed to provide continuous, precise image navigation and registration. Earth sensors 37 are used as a backup for the star trackers 33. The use of the backup Earth sensors 37 mitigates the risk of on-orbit anomalies caused by problems with the star trackers 33.

Image navigation and registration is generally accomplished generally in the manner described in U.S. Pat. Nos. 4,688,091 and U.S. Pat. No. 4,688,092 entitled "Spacecraft Camera Image Registration" and "Satellite Camera Image Navigation", respectively, both of which are assigned to the assignee of the present invention. The contents of these patents are incorporated herein by reference in their entirety. However, in the present invention, the gyros 32 and the star trackers 33 are used to control the spacecraft 20 and to produce spacecraft motion compensation signals.

The ground-based equipment 12 includes a command and data acquisition station 41, and a space operations control center such as are described in U.S. Pat. Nos. 4,688,091 and 4,688,092. However, in the present invention, an optional backup command and data acquisition station 43 and an auxiliary ranging system 44 are added. The backup command and data acquisition station 43 comprises substantially the same equipment as the command and data acquisition station 41. Details of each of these portions of the system 10 are described below with reference to FIG. 2. The ground-based equipment 12 communicates with the spacecraft 20 to process signals (images) produced by the imager 34 and the sounder 34, and generate image motion compensation coefficients that adjust the pointing direction of the scanning mirror 34a used by the imager 34 and the sounder 34.

Figure 2:
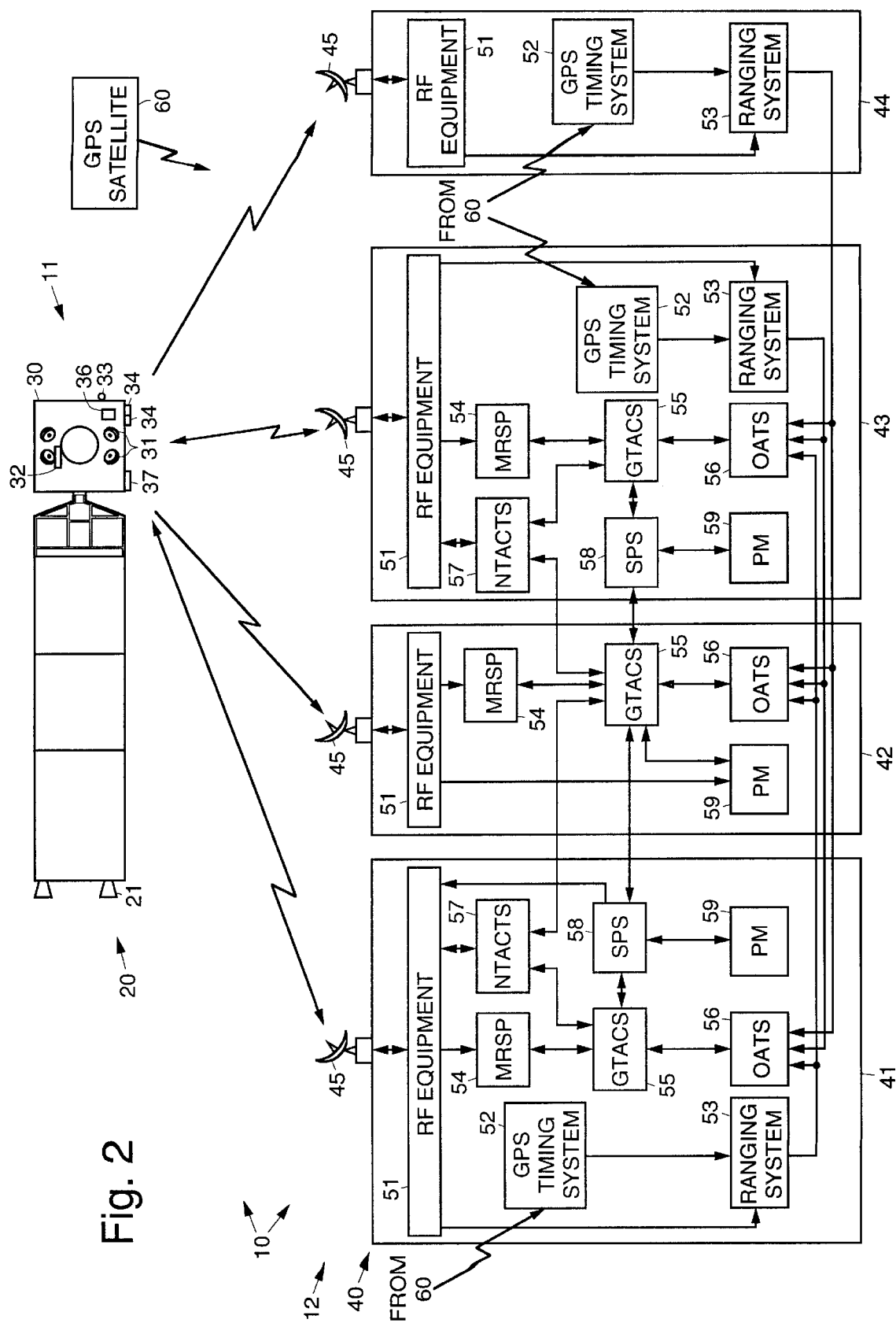
FIG. 2 illustrates details of ground-based equipment employed in the imaging system of the present invention.

Referring to FIG. 2, it illustrates details of the ground-based equipment 12 employed in the imaging system 10. The command and data acquisition station 41 comprises one or more antennas 45 that are used to communicate with the spacecraft 20. The antenna(s) 45 is (are) coupled to radio frequency (RF) equipment 51 that is coupled to a ranging system 53, a multiuse data link (MDL) receive server and processing (MRSP) system 54 and a telemetry acquisition and command transition system (NTACTS) 57.

The MDL receive server and processing system 54 and the telemetry acquisition and command transition system 57 are coupled to a GOES telemetry and command system (GTACS) 55. The GOES telemetry and command system 55 is coupled to an orbit and attitude tracking system (OATS) 56 and to a sensor processing system (SPS) 58. A product monitor (PM) 59 is coupled to the sensor processing system 58.

The orbit and attitude tracking system 56 interfaces with the spacecraft 20 to correct (adjust) the line of sight of the pointing mirrors 34a used by the imager 34 and sounder 34. Details of the orbit and attitude tracking system 56 are generally well known, and may be found in U.S. Pat. No. 4,688,092, the contents of which are incorporated herein by reference.

A global positioning system (GPS) timing system 52 is coupled to the ranging system 53 and receives timing signals from a global positioning system satellite 60. The imagery data including a range word is uplinked from the ground station 41 to the spacecraft 20. This data is then downlinked from the satellite 20 to the ranging system 53. The ranging system 53 extracts the range word and uses the GPS precision timing data to indicate the precise time of receipt of the range word transmitted from the spacecraft 20.

The space operations control center 42 comprises one or more antennas 45 that are used to communicate with the spacecraft 20. The antenna(s) 45 is (are) coupled to radio frequency (RF) equipment 51 that interfaces to the multiuse data link (MDL) receive server and processing (MRSP) system 54 and product monitor 59. The MRSP system 54 is coupled to a GOES telemetry and command system (GTACS) 55.

The GOES telemetry and command system 55 is coupled to an orbit and attitude tracking system 56 and to the product monitor 59. The GOES telemetry and command system 55 is coupled to the sensor processing system 58 of both the command and data acquisition station 41 and the backup command and data acquisition station 43. The GOES telemetry and command system 55 is also coupled to the telemetry acquisition and command transition system 57 of both the command and data acquisition station 41 and the backup command and data acquisition station 43.

The auxiliary ranging system 44 comprises one or more antennas 45 that are used to communicate with the spacecraft 20. The antenna(s) 45 is (are) coupled to radio frequency (RF) equipment 51 that is coupled to a ranging system 53. A GPS timing system 52 is coupled to the ranging system 53 and receives timing signals from a global positioning system satellite. The GPS timing system 52 generates range word time tags that are sent to the orbit and attitude tracking system 56. Range data in a GOES variable data format (GVAR) is downlinked from the spacecraft 20 to the ranging system 53. Each of the ranging systems 53 process the respective timing signals from the GPS timing system 52 and GOES variable data format data from the satellite 20 to generate range word time tags that are sent to the respective orbit and attitude tracking systems 56 in the command and data acquisition station 41, the space operations control center 42, and the backup command and data acquisition station 43.

The imager 34 and the sounder 34 transmit star position data are processed by the various orbit and attitude tracking systems 56 to compute image motion compensation coefficients that are sent to the attitude control electronics 36. The ground equipment 12 uploads the image motion compensation coefficients to the attitude control electronics 36 in the spacecraft 20. The attitude control electronics 36 processes image motion compensation coefficients received from the ground equipment 12 and generates image motion compensation signals in the form of mirror pointing commands (gimbal angle corrections). The mirror pointing commands are sent to the imager 34 and the sounder 34 which process them to adjust the pointing direction of the pointing mirrors 34a.

Figure 3:
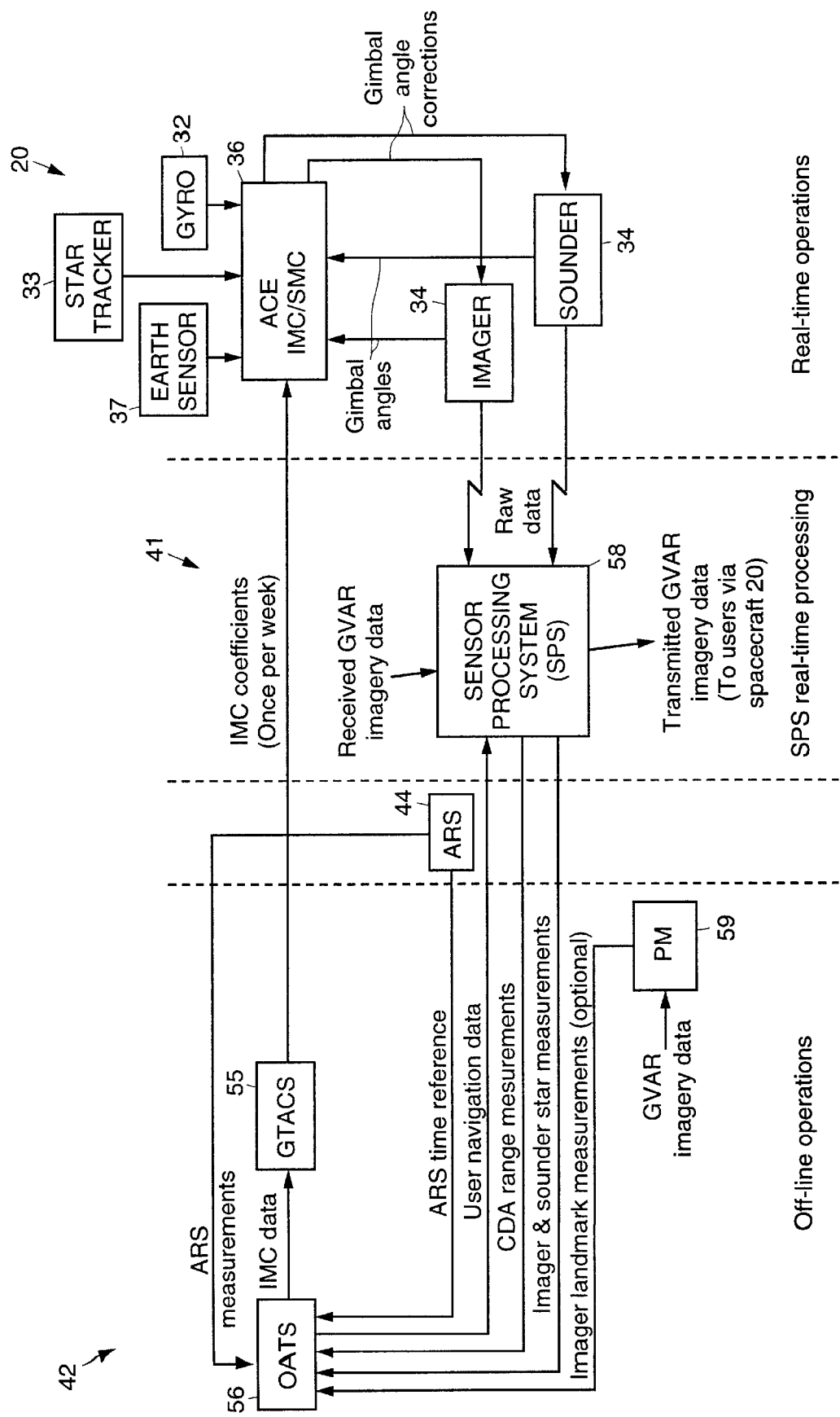
FIG. 3 illustrates processing performed by the imaging system of the present invention that provides for improved weather prediction accuracy.

FIG. 3 illustrates processing performed by the imaging system 10 that provides for improved weather prediction accuracy. On the spacecraft 20, the attitude control electronics (ACE) 36 processes inputs from the star trackers 33, the inertial reference unit 32, the imager 34 and the sounder 34. The star trackers 33 and the inertial reference unit 32 precisely and continuously sense the attitude of the spacecraft 20. The imager 34 and the sounder 34 output gimbal angles indicative of the pointing direction of the scanning mirrored 34a.

The imager 34 and the sounder 34 output raw data (comprising imagery data, star data, and gimbal angles) that are transmitted to the sensor processing system 58. The sensor processing system 58 process the raw data and outputs imager and sounder star measurements and CDA range measurements to the orbit and attitude tracking system 56. The product monitor 59 processes GOES variable data format image data to produce imager landmark measurements that are sent to the orbit and attitude tracking system 56. The auxiliary ranging system (ARS) 44 outputs ARS measurements and an ARS time reference to the orbit and attitude tracking system 56. The orbit and attitude tracking system 56 processes the ARS measurements, ARS time reference, imager landmark measurements imager and sounder star measurements and CDA range measurements to generate image motion compensation data and user navigation data. The image motion compensation data are sent to the GOES telemetry and command system (GTACS) 55 which generates image motion compensation coefficients. The image motion compensation coefficients are uploaded once per week to the attitude control electronics 36 in the spacecraft 20. The image motion compensation coefficients are processed by the attitude control electronics 36 to generate gimbal angle corrections which adjust the pointing direction of the pointing mirrors 34a. The user navigation data is sent to the sensor processing system 58 and is included in GVAR data.

Image navigation and registration will now be discussed in detail. The system 10 provides for improved image navigation and registration performance. Precise pointing is achieved as follows.

High frequency (>1 Hz) attitude disturbances are minimized by design. This includes the effect of momentum wheel imbalance and solar array stepping. The response of the spacecraft 20 to high frequency disturbances is <5 $\mu$rad. Low frequency (<0.01 Hz) attitude disturbances are controlled using data from the star trackers 33 and inertial reference units 32. Residual error in this frequency range is <2 $\mu$rad. Medium frequency (0.01–1.0 Hz) attitude disturbances are compensated for by the attitude control electronics 36 using data from the star trackers 33 and inertial reference units 32. The residual error after spacecraft motion compensation is <3 $\mu$rad.

Long-term frequency disturbances (e.g. thermal distortion and orbit motion) are compensated for by the attitude control electronics 36. Imager and sounder star measurements, imager landmarks, and range measurements from the command and data acquisition station 41 and the auxiliary range system 44 are processed by the orbit and attitude tracking system 56. Image motion compensation residual errors are <7 $\mu$rad for spacecraft implementation (frequency >0.5 Hz) and <17 $\mu$rad (long term) for spacecraft support ground system orbit and attitude determination and orbit and attitude modeling.

|  | Requirement (3$\sigma$, $\mu$rad) EW/NS | Performance (3$\sigma$, $\mu$rad) EW/NS |
|---|---|---|
| Imager | | |
| Navigation (±2 Km) | ±56/±56 | ±27/±19 |
| Registration | | |
| Within frame: | 42/42 | 32/22 |
| Line-to-line shear: | 20/20 | 12/12 |
| Frame-to-frame (15 minutes): | 28/28 | 25/17 |
| Frame-to-frame (90 minutes): | 42/42 | 27/18 |
| Frame-to-frame (24 hours): | 112/112 | 40/28 |
| Sounder | | |
| Navigation (±10 Km): | ±280/−280 | ±31/±18 |
| Registration | | |
| Within frame (120 minutes): | 84/84 | 47/21 |
| Frame-to-frame (90 minutes): | 84/84 | 26/17 |
| Frame-to-frame (24 hours): | 224/224 | 40/28 |
| Recovery time from maneuvers: | <6 hours | 5 hours |
| Recovery time from yaw flip maneuver: | ≦24 hours | <24 hours |
| Housekeeping: | Max of two 10 minutes/day | Not required |
| Resampling not permitted | | Not required |

The image navigation and registration system employed in the system 10 simplifies operation at the spacecraft operation control center 42. The image navigation and registration system includes a ground segment and a spacecraft segment. The ground segment at the spacecraft operation control center 42 includes the (1) orbit and attitude tracking system 56, which performs orbit and attitude determination and generates image motion compensation data; (2) GOES telemetry and command system (GTACS) 55 to convert the orbit and attitude tracking system image motion compensation data to spacecraft commands; and (3) the product monitor 59. Precise orbit determination and orbit modeling are essential for accurate earth pointing of any spacecraft 20 controlled by star trackers 33. This is achieved in the orbit and attitude tracking system 56 as follows.

The auxiliary ranging system (ARS) 44 acquires auxiliary ranging data from the command and data acquisition station 41 and one remote location. This capability virtually eliminates the orbit determination error and allows weekly, instead of daily, orbit and attitude determination. Auxiliary ranging station data also provides quick orbit recovery after a stationkeeping. The use of the auxiliary ranging station 44 potentially eliminates the use of landmarks in the orbit and attitude determination process. The orbit and attitude tracking system 56 determines the orbit from range only and determines attitude from star measurements made by the imager 34 and the sounder 34. Landmarks are only used to verify imager image navigation and registration performance.

The present image navigation and registration system 10 eliminates the GOES I-M short span attitude adjustments that are required every few hours over the spacecraft lifetime. Therefore, the present invention thus simplifies the spacecraft control center 42 operations and improves performance. Image motion compensation orbit-model coefficients have been increased from 24 (used in the GOES I-M system) to 43 to minimize orbit-prediction error over one week.

The ground segment at the command and data acquisition (CDA) station 41 includes (1) the sensor processing system 58 to process imager and sounder star measurements and to determine CDA range (RCDA) from the GOES variable data format transmit and receive data; and (2) an auxiliary ranging station to provide orbit and attitude tracking with the necessary reference time (TCDA) to compute range [R=RCDA+c*(T-TCDA)], where c is the speed of light and T is the auxiliary ranging station time tag of the received GOES variable data format range word. A GPS receiver (not shown) in the auxiliary ranging station 44 is used to provide this precise time tag and to precisely synchronize clocks at the two ranging locations.

The portion of the image navigation and registration system on the spacecraft 20 includes (1) the attitude control system (ACS), (2) spacecraft motion compensation system, and (3) image motion compensation system.

The attitude control system processes data from the star tracker, 33 and gyros 32 to precisely and continuously sense spacecraft attitude and eliminate short span attitude adjustment operations at the spacecraft operation control center 42. The earth sensor 37 is a backup for the star trackers 33. The pulsed plasma thrusters 21 are used in conjunction with the four momentum wheels 31. Using the pulsed plasma thrusters 21 eliminates the need for housekeeping operations and associated interruptions of imaging and sounding services. The pulsed plasma thrusters 21 also maintain the momentum wheels 31 at low speed, eliminating wheel disturbances to the imager 34 and sounder 34.

The spacecraft motion compensation system compensates for spacecraft attitude errors using measurements made by the star trackers 33 and gyros 32, momentum wheel torque commands, and dynamic models of the spacecraft 30, the imager 34, and the sounder 34. The spacecraft motion compensation system provides for a significant improvement over the previously employed GOES I-M mirror motion compensation system that uses only momentum wheel torque commands and spacecraft, imager and sounder dynamic models.

The image motion compensation system compensates for deterministic long-term orbit and attitude deviations from ideal synchronous orbit and zero attitude using the ground-supplied coefficients. The image motion compensation algorithm in the orbit and attitude tracking system and in the attitude control electronics computer accounts for the increase in orbit model coefficients in the orbit and attitude tracking system and the implementation of imager and sounder misalignments. The IMC/SMC system provides users with images registered at the spacecraft 20 (without resampling).

In operation, following a post-launch test period, the spacecraft 20 is repositioned to its operational longitude, where it begins normal on-orbit operations. During normal operations, the use of the capabilities in the on-board computer 36 significantly reduces the number of commands required on a daily or weekly basis compared to GOES I-M system. Spacecraft housekeeping functions are performed autonomously by the on-board computer 36. The only routine commands are for image navigation and registration operations.

Instead of requiring daily uploading every command to the instruments, the camera command sequences are stored in the computer 36 on board the spacecraft 20. The number of daily commands are fewer than 50, while once-a-week commanding uses fewer than 150 commands. The daily instrument commanding is entirely spacecraft-based, which improves weather product availability and simplifies operations.

The spacecraft support ground system uses multi-station GVAR ranging for normal on-orbit operations. The sensor processing system 58 measures time differences between the GOES variable data format range word transmission and receipt. The sensor processing system 58 forwards this information to orbit and attitude tracking system for processing and inclusion into the orbit and attitude determination process. Additional equipment time tags the range word receipt at the remote auxiliary ranging station 44.

The two-station ranging configuration provides the accurate range data needed to meet image navigation and registration requirements independently at the SPS site. The difference in the two receipt times provides data for computing range from the spacecraft to the auxiliary ranging station 44.

The telemetry and command system (GTACS) 55 commands and controls the spacecraft. As part of that functionality it also monitors the health and safety of the spacecraft and reports anomalies. GOES telemetry and command system 55 provides for central control of the spacecraft support ground system, the GOES telemetry and command system 55 interfaces with orbit and attitude tracking system 56 by providing telemetry data for analysis, star data for image navigation and registration processing and receiving commands in support of both image navigation and registration and stationkeeping functionality.

The GOES telemetry and command system 55 communicates with the sensor processing system 58 to receive star and range observation data and GOES variable data format statistical data and to serve as the sensor processing system 58 configuration and control center for tailoring the sensor processing system 58 for specific processing needs.

The GOES telemetry and command system 55 provides star information to the orbit and attitude tracking system 56. The GOES telemetry and command system 55 matches the star commands with star data received from the sensor processing system 58 before sending the information to the orbit and attitude tracking system 56. The capability of the GOES telemetry and command system 55 to send the star commands from the ground to the spacecraft 20 also enables it to serve as the backup to the on-board process.

The above description provides for a general understanding of the various systems that are employed in implementing different aspects of the present invention. The following discussion addresses various inventive aspects of the present invention.

Figure 4:
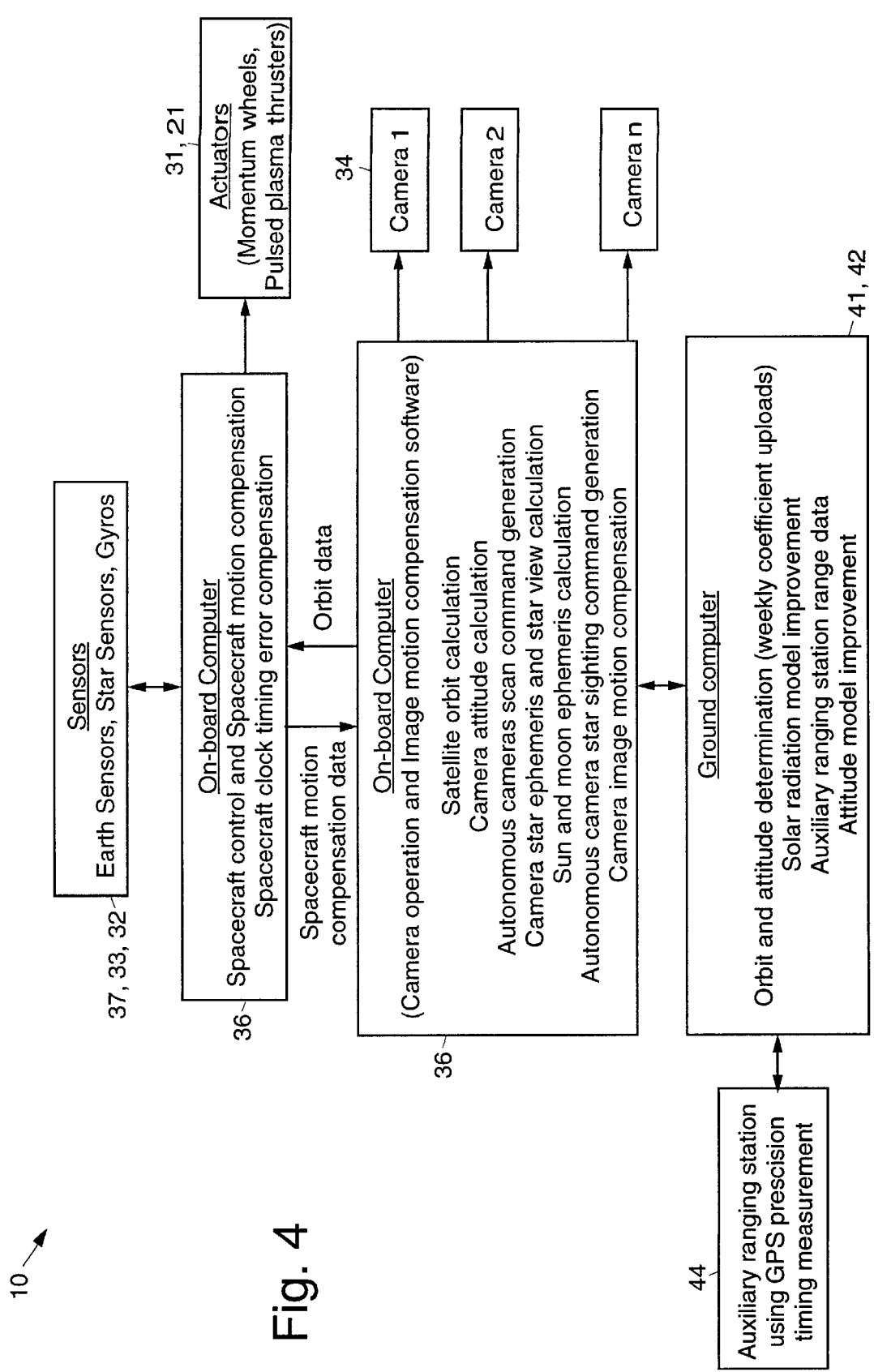
FIG. 4 is a simplified block diagram that illustrates various features of the system that implement various aspects of the present invention.

Referring to FIG. 4, it shows the functions performed by the components of the system 10. The sensors 32, 33, 37 on the spacecraft 20 interface with the on-board computer 36. The on-board computer 36 performs spacecraft control and spacecraft motion compensation functions, and also provides for spacecraft clock timing error compensation. The on-board computer 36 is coupled to the cameras 34 on-board the spacecraft 20 and embodies camera operation and image motion compensation software that performs spacecraft orbit calculations, camera attitude calculations, generation of camera scan commands, performs camera star ephemeris and star view calculations, performs sun and moon ephemeris calculations generates autonomous camera star sighting commands, and performs camera image motion compensation.

The ground computers 41, 42 communicate with the on-board computer 36 on the spacecraft 20 and with the auxiliary ranging station 44. The ground computers 41, 43 perform orbit and attitude determination that permits weekly uploading of coefficient to the spacecraft 20. The ground computers 41, 42 embody an improved solar radiation model, process auxiliary range data derived from the auxiliary ranging station 44, and embody an improved spacecraft attitude model. Each of these improved functions cooperate to provide for improved system performance. Specific novel features of the present invention will now be described in detail with reference lo FIGS. 5–7.

Figure 5A:
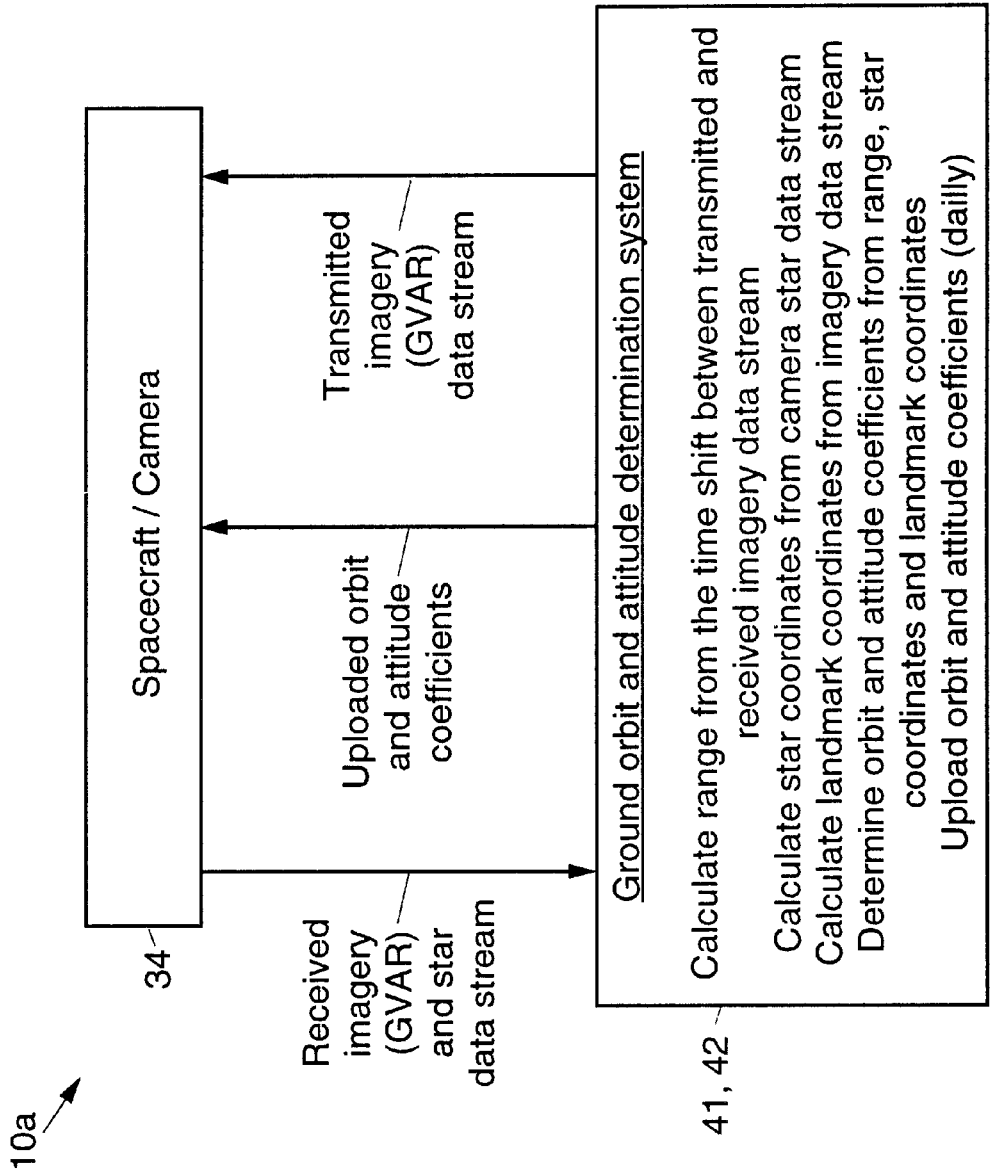
FIG. 5a illustrates orbit and attitude processing performed by a prior art embodiment of a satellite based imaging system.

Referring to FIG. 5a, it illustrates orbit and attitude processing performed by a prior art satellite-based imaging system 10a. In the prior art system 10a, orbit and attitude determination was made by processing imagery data stream (GVAR) and star data derived from the camera 34. The data from the camera 34 was transmitted to the ground station for processing. An imagery data stream (GVAR) was transmitted to the spacecraft 20 and orbit and attitude coefficients were uploaded to the spacecraft 20. The range to the spacecraft 20 was calculated using the time shift between transmitted and received imagery data streams (GVAR). Star coordinates were calculated from data in the star data stream. Landmark coordinates were calculated from data in the imagery data stream (GVAR). Orbit and attitude coefficients were determined using the range, star coordinates and landmark coordinates. The orbit and attitude coefficients were uploaded to the spacecraft 20 on a daily basis.

Figure 5B:
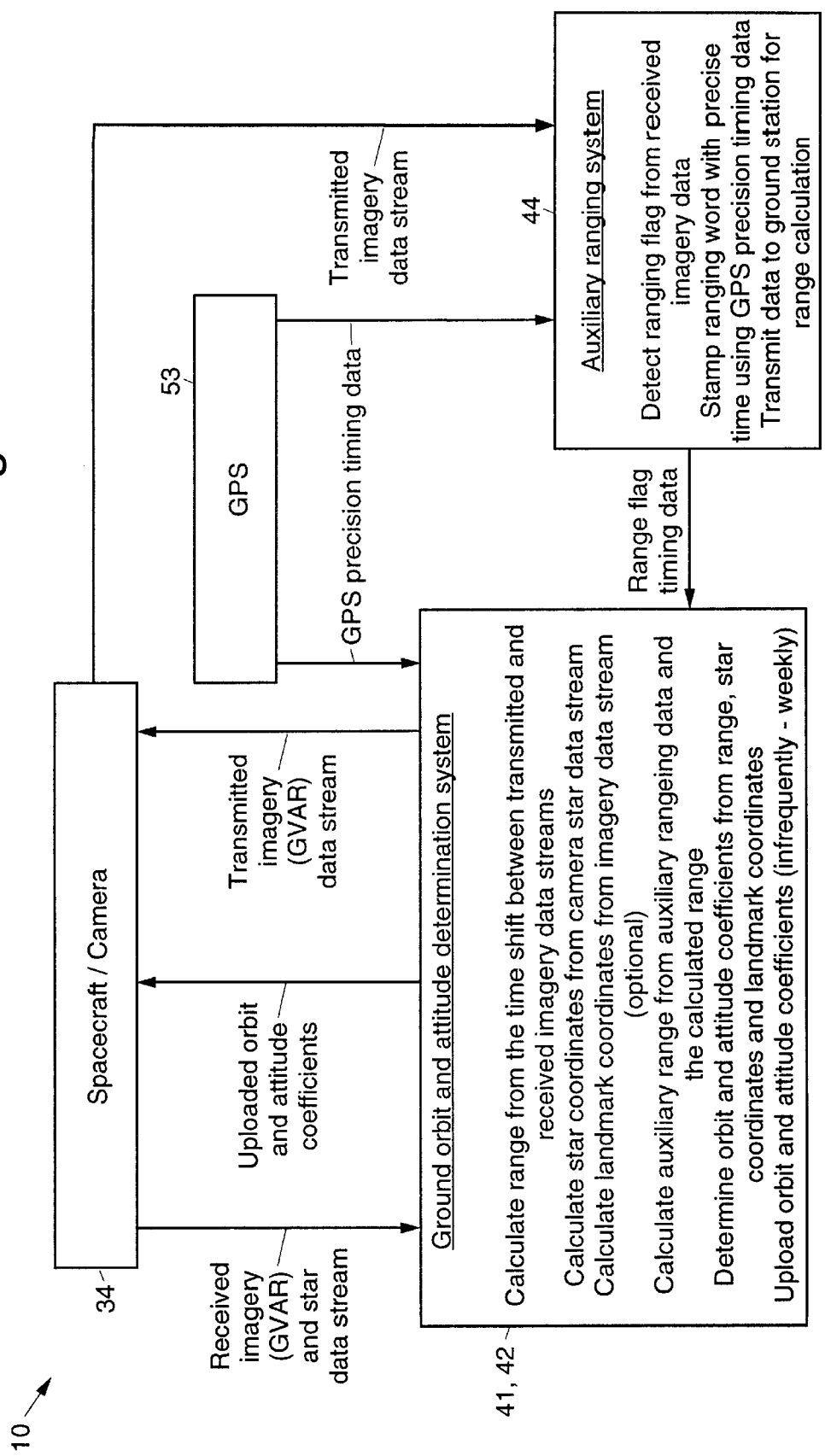
FIG. 5b illustrates orbit and attitude processing performed by an embodiment of the present satellite based imaging system.

Referring now to FIG. 5b, it illustrates orbit and attitude processing performed by an embodiment of the present satellite based imaging system 10. In the present system 10, orbit and attitude determination are made by processing imagery and star data derived from the camera 34. The data from these instruments is transmitted to the ground station for processing. An imagery data stream is transmitted to the spacecraft 20 and orbit and attitude coefficients are uploaded to the spacecraft 20. The range to the spacecraft 20 is calculated using the time shift between transmitted and received imagery data streams. Star coordinates are calculated from data in the star data stream output by the camera 34. Landmark coordinates are optionally calculated from data in the imagery data stream. The auxiliary ranging system 44 cooperates with the global positioning system 60 to detect a ranging word contained in the imagery data. The auxiliary ranging system 44 stamps the ranging word with a precise time using precision timing data derived from the global positioning system 60. An auxiliary range is calculated from the auxiliary ranging data and the range calculated using the time shift between transmitted and received imagery data streams. Orbit and attitude coefficients are determined using the range, star coordinates and landmark coordinates. The orbit and attitude coefficients are uploaded to the spacecraft 20 on an infrequent (weekly) basis due to the more precise range data generated by the present system 10.

Figure 6A:
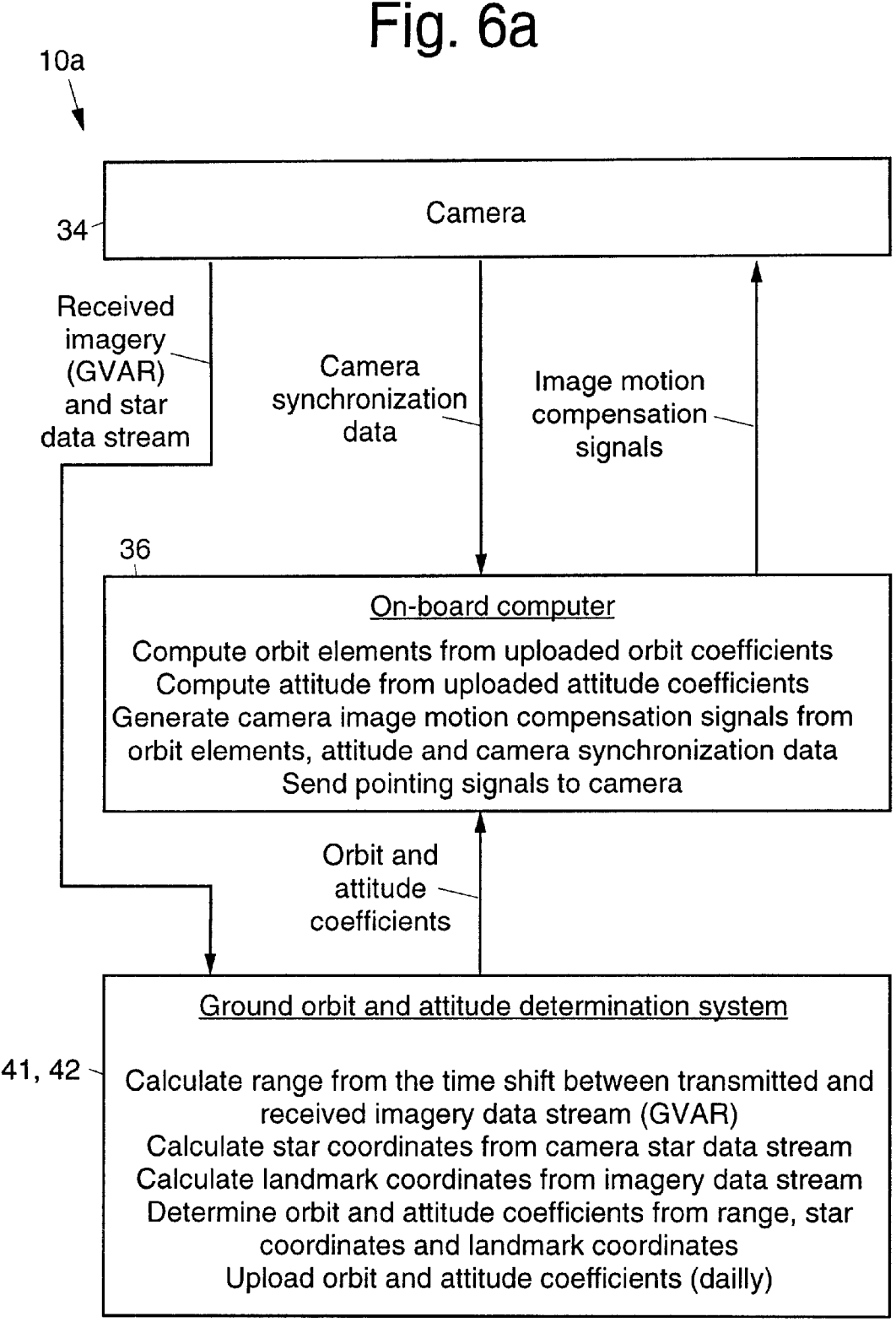
FIG. 6a illustrates image motion compensation processing performed by a prior art embodiment of a satellite based imaging system.

Referring to FIG. 6a, it illustrates image motion compensation processing performed by a prior art embodiment of a satellite-based imaging system 10a. In the prior art system 10a, imagery data stream (GVAR) and star data derived from the camera 34 was transmitted to the ground station for processing. The ground station transmitted an imagery data stream to the spacecraft 20. The ground station processed the received imagery and star data and calculated the range of the spacecraft 20 from the time shift between transmitted and received imagery data streams.

The range to the spacecraft 20 was calculated using the time shift between transmitted and received imagery data streams. Star coordinates were calculated from data in the star data stream. Landmark coordinates were calculated from data in the imagery data stream. Orbit and attitude coefficients were determined using the range, star coordinates and landmark coordinates. The orbit and attitude coefficients were uploaded to a computer system 36 the on-board spacecraft 20 on a daily basis.

Camera synchronization data was transmitted from the camera 34 to the computer system 36 onboard the spacecraft 20. The computer system 36 onboard the spacecraft 20 computed orbit elements using uploaded orbit and attitude coefficients. The computer system 36 onboard the spacecraft 20 computed the attitude of the spacecraft using the uploaded orbit and attitude coefficients. The computer system 36 onboard the spacecraft 20 generated camera image motion compensation signals using the orbit elements, attitude and camera synchronization data. The computer system 36 onboard the spacecraft 20 transmitted pointing signals to the camera 34.

Referring now to FIG. 6b, it illustrates image motion compensation processing performed by an embodiment of the present imaging system 10. In the present system 20, imagery and star data derived from the camera 34 is transmitted to the ground station for processing. The ground station transmits an imagery data stream to the spacecraft 20. The ground station processes the received imagery and star data and calculated the range of the spacecraft 20 from the time shift between transmitted and received imagery data streams.

The range to the spacecraft 20 is calculated using the time shift between transmitted and received imagery data streams. Star coordinates are calculated from data in the star data stream. Landmark coordinates are optionally calculated from data in the imagery data stream. The auxiliary ranging system 44 cooperates with the global positioning system 60 to detect a ranging word contained in the imagery data. The auxiliary ranging system 44 stamps the ranging word with a precise time using precision timing data derived from the global positioning system 60. An auxiliary range is calculated from the auxiliary ranging data and the range calculated using the time shift between transmitted and received imagery data streams. Precise orbit and attitude coefficients are determined using the range, star coordinates and optionally the landmark coordinates. The orbit and attitude coefficients are uploaded to the computer system 36 on-board the spacecraft 20 on an infrequent (weekly) basis.

Camera synchronization data is transmitted from the camera 34 to the computer system 36 on-board the spacecraft 20. The computer system 36 onboard the spacecraft 20 computes precise orbit elements using the uploaded orbit and attitude coefficients and a precise orbit model having additional luni-solar frequencies. The computer system 36 onboard the spacecraft 20 computes the precise attitude of the spacecraft 20 using the uploaded orbit and attitude coefficients. The computer system 36 onboard the spacecraft 20 generates precise camera image motion compensation signals using the precise orbit elements, attitude and camera synchronization data. The computer system 36 onboard the spacecraft 20 transmits pointing signals to the camera 34.

Figure 7B:
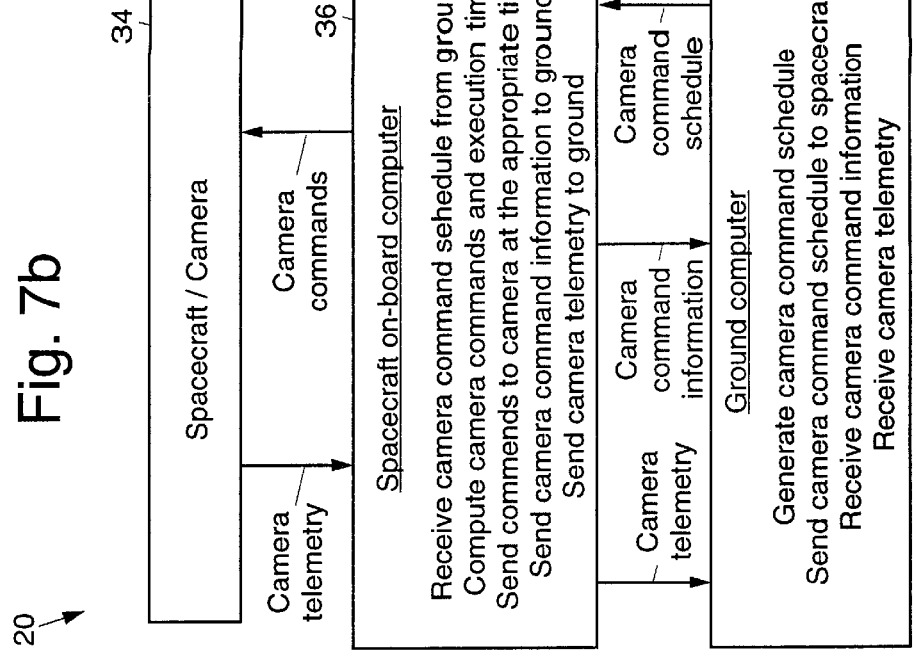
FIG. 7b illustrates camera command processing performed by an embodiment of the present satellite based imaging system.
Figure 7A:
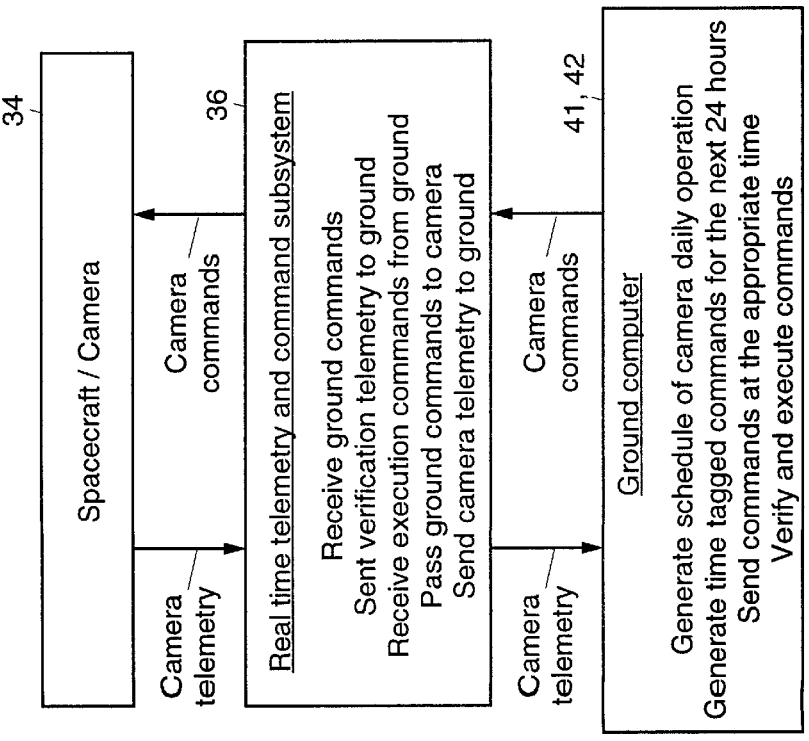
FIG. 7a illustrates camera command processing performed by a prior art embodiment of a satellite based imaging system.

Referring to FIG. 7a, it illustrates camera command processing performed by a prior art embodiment of a satellite-based imaging system 10a. In the prior art system 10a, camera telemetry from the camera 34 on-board the spacecraft 20 is transmitted to a real time telemetry and command subsystem 36 on-board the spacecraft 20. Camera commands are sent from the telemetry and command subsystem to the camera 34. The telemetry and command subsystem 36 on-board the spacecraft 20 transmits the camera telemetry to the ground computer 41, 42. The ground computer 41, 42 generates a schedule of daily camera operations. The ground computer 41, 42 generates time tagged commands for the next 24 hours. The ground computer 41, 42 sends commands to the telemetry and command subsystem 36 at the appropriate time. The ground computer 41, 42 verifies and executes commands.

The telemetry and command subsystem 36 on the spacecraft 20 receives the ground commands. The telemetry and command subsystem sends verification telemetry to the ground computer 41, 42. The telemetry and command subsystem receives execution commands from the ground computer 41, 42. The telemetry and command subsystem passes ground commands to the camera 34 and sends camera telemetry to the ground computer 41, 42.

Referring now to FIG. 7b, it illustrates camera command processing performed by an embodiment of the present satellite based imaging system 10. In the present system 10, camera telemetry from the camera 34 on-board the spacecraft 20 is transmitted to a computer 36 on-board the spacecraft 20. Camera commands are sent from the on-board computer 36 to the camera 33. The on-board computer 36 transmits the camera telemetry and camera command information to the ground computer 41, 42. The ground computer 41, 42 receives camera command information and camera telemetry. The ground computer 41, 42 generates a camera command schedule of camera operations. The ground computer 41, 42 sends the camera command schedule to the on-board computer 36.

Thus, an improved satellite-based imaging system has been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A precise spacecraft camera image navigation and registration method for use with a spacecraft orbiting about a central body, comprising the steps of:

launching a spacecraft into an orbit about the central body, which spacecraft comprises a camera, and one or more sensors selected from the group including: a star tracker, a central body sensor, and a gyro; and selectively processing attitude data derived from (1) the camera, and the star tracker, (2) the camera, the star tracker and the gyro, (3) the camera, the central body sensor and the gyro, or (4) the camera, the star tracker, the central body sensor and the gyro, to point the spacecraft and point the camera.

2. The method recited in claim 1 further comprising the step of:

generating camera orbit and attitude coefficients for pointing the camera using (1) landmark measurements made using the camera, and range measurements from at least two ground stations located on the central body, (2) star measurements made using the camera, and range measurements from at least two ground stations located on the central body, or (3) landmark measurements made using the camera, star measurements made using the camera, and range measurements from at least two ground stations located on the central body.

3. The method recited in claim 2 wherein the orbit and attitude coefficients are processed by one of the ground stations to provide for image navigation of images generated by the camera.

4. The method recited in claim 2 wherein the orbit and attitude coefficients are uploaded to the spacecraft and processed on-board the spacecraft to generate and apply image motion compensation signals to autonomously register camera images in real time.

5. The method recited in claim 2 wherein the orbit coefficients are generated using a precise orbit model that includes significant frequencies produced by perturbing bodies to extend the validity of the orbit model over an extended period of time to simplify operations on the central body.

6. The method recited in claim 5 wherein the perturbing bodies include the earth, the moon, and the sun.

7. The method recited in claim 2 wherein the attitude coefficients are generated using a precise attitude model representing attitude variations over an extended period of time to simplify operations on the central body.

8. The method recited in claim 7 wherein the extended period of time is about one week.

9. The method recited in claim 1 wherein:

the step of launching a spacecraft further comprises the step of launching a spacecraft comprising an on-board computer; and wherein the method further comprises the step of generating camera commands using the on-board computer to reduce uploading of daily ground commands from the central body.

10. A spacecraft-based imaging system having improved image navigation and registration, comprising:

a spacecraft comprising a camera, camera pointing apparatus that adjusts the pointing direction of the camera, an on-board computer coupled to the camera and camera pointing apparatus for controlling the pointing direction of the camera, and one or more sensors selected from the group including: a star tracker, a central body sensor, and a gyro; and the on-board computer selectively processing attitude data derived from (1) the camera and the star tracker, (2) the camera, the star tracker and the gyro, (3) the camera, the central body sensor and the gyro, or (4) the camera, the star tracker, the central body sensor and the gyro, to generate pointing signals that are used to point the spacecraft and point the camera.

11. The system recited in claim 10 further comprising at least two ground stations located on a central body; and wherein the camera orbit and attitude coefficients for pointing the camera are generated using (1) landmark measurements made using the camera and range measurements from the at least two ground stations, (2) star measurements made using the camera and range measurements from the ground stations, or (3) landmark measurements made using the camera, star measurements made using the camera, and range measurements from the ground stations.

12. The system recited in claim 11 wherein the orbit and attitude coefficients are processed by the computer onboard the spacecraft to provide for image navigation, and registration.

13. The system recited in claim 11 wherein the orbit and attitude coefficients are uploaded to the spacecraft and processed by the computer 36 onboard the spacecraft to generate and apply image motion compensation signals to autonomously register camera images in real time.

14. The system recited in claim 11 wherein the orbit coefficients are generated using a precise orbit model that includes significant frequencies produced by perturbing bodies to extend the validity of the orbit model over an extended period of time to simplify operations on the central body.

15. The system recited in claim 11 wherein the attitude coefficients are generated using a precise attitude model representing attitude variations over an extended period of time to simplify operations on the central body.

16. The system recited in claim 10 wherein the extended period of time is about one week.

17. The system recited in claim 10 wherein the on-board computer generates camera commands to reduce uploading of daily ground commands from the central body.

* * * * *